United States Patent [19]

Strauch et al.

[11] Patent Number: 6,102,674

[45] Date of Patent: Aug. 15, 2000

[54] ELECTRICALLY OPERATED COOLANT PUMP

[75] Inventors: Joachim Strauch; Harald Pastleitner; Gerald Buha, all of Steyr, Austria

[73] Assignee: TCG Unitech Aktiengesellschaft, Kirchdorf/Krems, Austria

[21] Appl. No.: 09/154,079

[22] Filed: Sep. 16, 1998

[30] Foreign Application Priority Data

Sep. 19, 1997 [AT] Austria ..................................... 1587/97

[51] Int. Cl.⁷ .................................................. F04B 17/00
[52] U.S. Cl. .............................. 417/423.12; 417/423.14
[58] Field of Search .............................. 417/423.12, 321, 417/410.1, 423.1, 423.13

[56] References Cited

U.S. PATENT DOCUMENTS

| | | |
|---|---|---|
| 2,500,400 | 3/1950 | Cogswell . |
| 3,719,436 | 3/1973 | McFarlin . |
| 3,933,416 | 1/1976 | Donelian ................................. 417/354 |
| 4,413,958 | 11/1983 | Webb . |
| 4,678,405 | 7/1987 | Allen ....................................... 417/245 |
| 4,795,931 | 1/1989 | Sturm ........................................ 310/90 |
| 4,890,988 | 1/1990 | Kramer et al. ........................... 417/372 |
| 4,911,610 | 3/1990 | Oleschewski et al. ............... 415/170.1 |
| 4,990,068 | 2/1991 | Zhong et al. ......................... 417/423.8 |
| 5,028,218 | 7/1991 | Jensen et al. ......................... 417/423.3 |
| 5,044,788 | 9/1991 | Murphy et al. .......................... 384/577 |
| 5,219,276 | 6/1993 | Metzner et al. ......................... 417/356 |
| 5,273,404 | 12/1993 | Wu . |
| 5,288,215 | 2/1994 | Chancellor et al. . |
| 5,317,579 | 5/1994 | Adsett ....................................... 372/35 |
| 5,407,331 | 4/1995 | Atsumi . |
| 5,609,475 | 3/1997 | Eiermann ................................ 417/294 |
| 6,042,347 | 3/2000 | Scholl et al. ......................... 417/423.12 |

Primary Examiner—Teresa Walberg
Assistant Examiner—Daniel Robinson
Attorney, Agent, or Firm—Watson Cole Grindle Watson, P.L.L.C.

[57] ABSTRACT

The invention relates to an electrically operated coolant pump with a rotor which is encompassed by a stator of the electromotor and comprises a rotor shaft with hollow design through which the liquid supply to the impeller is made, with the stator being arranged in a stator chamber of the motor housing and the rotor shaft being rotationally held in the motor housing, with the bearing of the rotor shaft being effected by way of roller bearings.

In order to increase the efficiency and reduce the wear and tear of the bearings, it is proposed that at least one roller bearing is arranged as a leakproof roller bearing and sealing elements are integrated in the roller bearing cages, and that the stator chamber which is separated in a leakproof manner from the conveying liquid is provided with a dry design.

3 Claims, 1 Drawing Sheet

ELECTRICALLY OPERATED COOLANT PUMP

BACKGROUND OF THE INVENTION

The invention relates to an electrically operated coolant pump with a rotor which is encompassed by a stator of the electromotor and comprises a rotor shaft with hollow design through which the liquid supply to the impeller is made, with the stator being arranged in a stator chamber of the motor housing and the rotor shaft being rotationally held in the motor housing, with the bearing of the rotor shaft being effected by way of roller bearings.

DESCRIPTION OF THE PRIOR ART

U.S. Pat. No. 5,288,215 A shows an electrically operated pump whose hollow rotor shaft is held by way of roller bearings. The roller bearings are separated from the chambers filled with the liquid to be conveyed by way of separate floating mechanical seals. An internal oil circulation is provided for the purpose of cooling the electromotor of the pump, with separate impeller blades which are connected with the rotor shaft being arranged at either end of the stator chamber for the purpose of oil conveyance.

Coolant pumps are known in which the rotor shaft is held by sliding bearings in the motor housing of the electromotor. A can of a motor is arranged between the stator and the rotor, which can is connected with the rotor and rests on the motor housing by way of O-rings. Said can is used to separate the space between stator and rotor, as the stator chamber must remain dry, whereas the rotor chamber is filled with conveying liquid. In order to avoid hindering the magnetic flow, the can is made of plastic. This arrangement has the disadvantage, however, that as a result of this design there will be a relatively large gap between rotor and stator and thus comparably large gap leakages will occur. If the wall thickness of the can is provided with too thin an arrangement, there will be leakages between the can and the O-ring seals as a result of increased wear and tear, particularly under higher thermal stresses.

Moreover, from FR 2 608 228 A a coolant pump with a hollow rotor shaft is known which is held by way of sliding bearings in the motor housing and which is encompassed by a stator. Measures for sealing the rotor chamber from the stator chamber have not been provided. However, in a flooded stator chamber it is necessary to provide additional measures in order to insulate the stator windings from the coolant. These, however, have a negative effect on the efficiency.

The bearing by way of sliding bearings leads to the further disadvantage that in the case of slow pump speed mixed friction will occur in the sliding bearings which subjects the same to increased wear and tear.

U.S. Pat. No. 5,407,331 A shows a motor-driven pump for rocket fuel, in particular liquid oxygen, with the rotor shaft being held by way of roller bearings. The specification does not give any indications as to the use of leakproof roller bearings.

U.S. Pat. No. 3,719,436 A shows an electromotively driven axial pump with a hollow rotor shaft which is held by way of roller bearings in a housing. The sealing of the rolling bearings is effected by way of separate sealing rings. Moreover, a can is provided between the rotor chamber and the stator chamber.

U.S. Pat. No. 5,273,404 A also shows an electrically operated coolant pump with axial impellers, with the liquid transport being effected through the hollow rotor shaft which is held in a housing by way of roller bearings. This specification does not provide any measures for sealing the roller bearings from the conveying liquid.

U.S. Pat. No. 4,413,958 A shows an electrically operated pump arrangement, with the hollow rotor shaft being held in a housing by way of roller bearings. This specification also does not give any indications that the roller bearings are provided with a leakproof arrangement.

SUMMARY OF THE INVENTION

It is the object of the present invention to avoid such disadvantages and to improve the efficiency in a coolant pump of the kind mentioned above and to allow a low-wear operation at any operational speed.

This is achieved in accordance with the invention in that at least one roller bearing is arranged as a leakproof roller bearing and sealing elements are integrated in the roller bearing cage and that the stator chamber which is separated in a leakproof manner from the conveying liquid is provided with a dry design. The roller bearings allow a low-wear operation at any pump speed and enable a very compact design of the electromotor-pump unit. The function of the sealing between the end regions of the rotor shaft and the stator chamber are assumed by the leakproof roller bearings. This allows omitting further sealing means such as a can or the like, and the gap can be provided with the smallest possible dimension, which will have an advantageous effect on the efficiency.

Roller bearings provided with a self-sealing arrangement such as sealing discs have been known for a long time. Such bearings with sealing discs arranged on either side are usually provided by the manufacturer with a grease filling and are regarded as maintenance-free bearings. The sealing discs are used to prevent the escape of the grease filling on the one hand and the penetration of foreign matter such as spray water or the like on the other hand. Until now it was assumed that specially where pumps are concerned own sealing apparatuses are necessary in order to ensure a reliable sealing of the stator chamber against gap chambers filled with the conveying liquid which is under pressure.

It was surprisingly noticed that further sealing measures can be omitted if the roller bearings per se are provided with a leakproof arrangement. As a result of the omission of additional sealing measure, the designer has more freedom in the design and construction of the pump, so that the size can be reduced considerably as compared with known comparable pumps. At the same time, components can be saved, thus enabling a very low-cost production. The stator chamber, which is provided with a dry design in a very simple manner, has the additional advantage over pumps with flooded stator chambers that far lower losses have to be taken into account.

Particularly in the case of coolant pumps with a high rotational speed it is advantageous if at least one roller bearing is arranged as an angular ball bearing. Optionally, two angular ball bearings can be provided in a tandem arrangement in order to increase the stiffness in the axial direction. It is also possible to use one or two angular ball bearings in combination with single- or multi-row cylindrical roller bearings.

It is further advantageous if the electromotor is a synchronously running motor. This allows for a very favourable control of the rotational speed by power electronics, as a result of which a relatively high torque can be produced in the starting phase in particular. An impeller that has become jammed owing a longer standstill of the pump can be made well-running again without any major efforts.

BRIEF DESCRIPTION OF THE DRAWINGS

The invention is now explained in closer detail by reference to the enclosed figures, wherein.

DETAILED DESCRIPTION OF PREFERRED EMBODIMENTS

Figure 1:
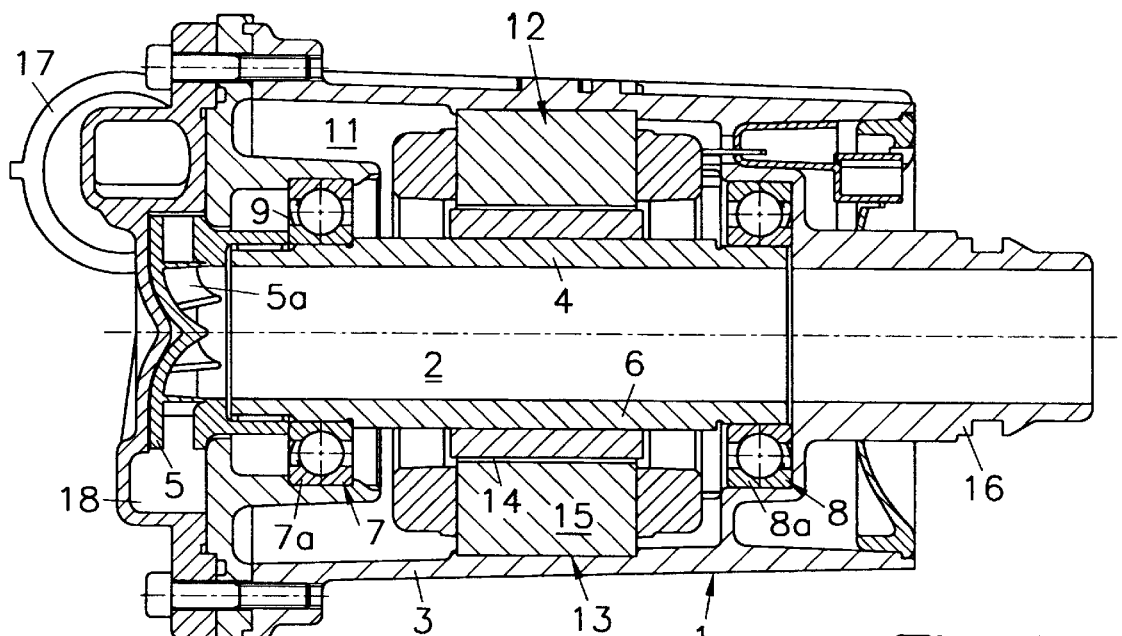
FIG. 1 shows a longitudinal section through the coolant pump in accordance with the invention.
Figure 2:
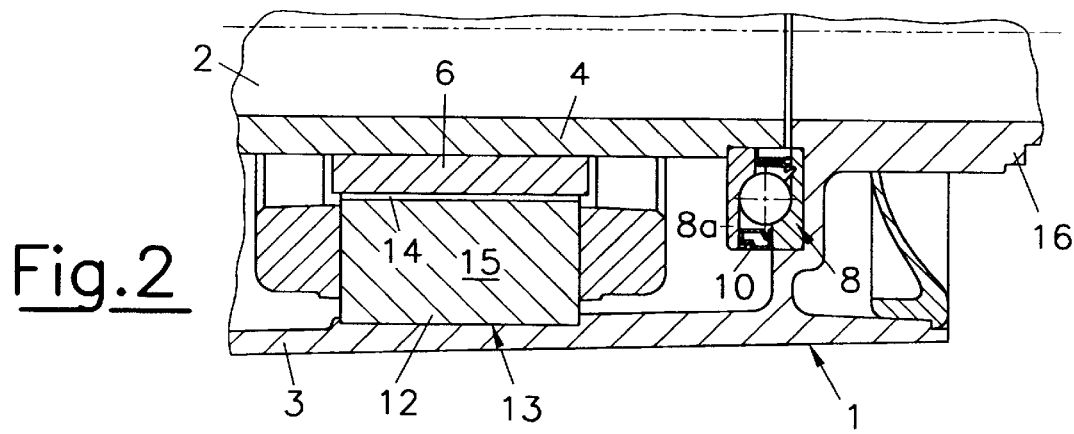
FIGS. 2 and 3 show variants of bearing arrangements in detail.

FIG. 1 shows a longitudinal section through the coolant pump 1 with a rotor 2 and a motor housing 3. The rotor 2 consists of a hollow rotor shaft 4, the impeller 5 which is fixedly connected to the rotor shaft 4 and the rotor plates 6 which are attached on the rotor shaft 4. The rotor shaft 4 is held at either end in the motor housing 3 by means of roller bearings 7, 8 which are arranged as ball bearings. The roller bearing cages 7a, 8a of roller bearings 7, 8 are provided with a leakproof arrangement and have sealing elements 9, 10 which separate the stator chamber 11, in which the stator 12 of the electromotor 13 is arranged, from the liquid-filled chambers which are adjacent to the roller bearings 7, 8. This prevents, on the one hand, the contact of the roller elements of the roller bearings 7 and 8 with the conveying liquid and ensures, on the other hand, that the stator chamber 11 remains dry. The roller bearings 7, 8 allow a very compact design of the coolant pump 1 and allow an optimal bearing at any rotational speed in the pump characteristic diagram. As a result of the fact that the roller bearings 7, 8 are provided with a leakproof arrangement, additional sealing elements can be omitted, so that complex sealing measures between rotor 2 and stator 12 can be avoided. Thus, the air gap 14 between the rotor plate 6 and the stator plate 15 can be chosen as small as possible, thus enabling the minimization of the air gap losses.

The conveying liquid reaches via nozzle 16 the hollow rotor shaft 4 and from there the impeller 5 and is supplied to the coolant discharge 17 after passing the impeller blades 5a and the pump spiral 18.

Apart from the embodiment as is shown in FIG. 1, the roller bearings can be arranged as leakproof angular contact ball bearings and, optionally, also as tandem angular contact ball bearings, which enables a high rotational speed. Moreover, it is possible to use one or two angular contact ball bearings in combination with single- or multiple-row cylindrical roller bearings.

Figure 3:
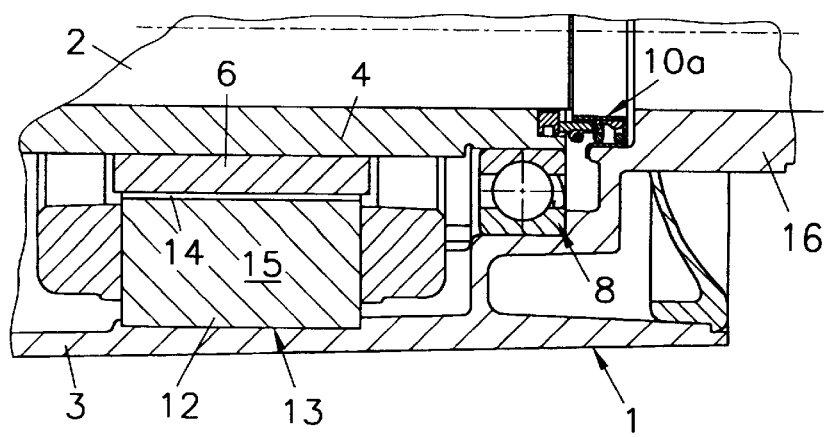

As an alternative to the roller bearings 7, 8 whose roller bearing cages 7a, 7b are provided with sealing elements 9, 10, other known shaft seals can be used for sealing off the roller bearings 7, 8 from the liquid-filled chambers, e.g. axial face seals 10a, as is illustrated in FIG. 3.

As the rotor shaft 4 is practically not accessible from the outside, the electromotor 13 is preferably arranged as a synchronously running motor which is provided with a relatively high starting torque. This allows a rotor 2 that has become jammed after a longer period of standstill to become unjammed again without any external intervention.

We claim:

1. An electrically operated coolant pump comprising:

a rotor including a rotor shaft with hollow design and an impeller which is connected to said rotor shaft, wherein the rotor is encompassed by a stator of an electromotor, and wherein a liquid supply to the impeller is made through the rotor shaft, with the stator being arranged in a stator chamber of a motor housing and the rotor shaft being rotationally held in the motor housing, with the bearing of the rotor shaft being effected by way of roller bearings, wherein at least one roller bearing is arranged as a leakproof roller bearing and sealing elements are integrated in the roller bearing cage, and wherein the stator chamber which is separated in a leakproof manner from the conveying liquid is provided with a dry design.

2. A coolant pump according to claim 1, wherein at least one of the roller bearings is arranged as an angular contact roller bearing.

3. A coolant pump according to claim 1, wherein the electromotor is a synchronously running motor.

* * * * *